(12) United States Patent
Elias et al.

(10) Patent No.: US 10,403,134 B2
(45) Date of Patent: Sep. 3, 2019

(54) CHARGING STATION FOR MOTOR VEHICLES AND METHOD FOR OPERATING A CHARGING STATION

(71) Applicant: AUDI AG, Ingolstadt (DE)

(72) Inventors: Björn Elias, Hepberg (DE); Reinhard Peer, Gaimersheim (DE)

(73) Assignee: AUDI AG, Ingolstadt (DE)

( * ) Notice: Subject to any disclaimer, the term of this patent is extended or adjusted under 35 U.S.C. 154(b) by 12 days.

(21) Appl. No.: 15/573,494

(22) PCT Filed: May 12, 2016

(86) PCT No.: PCT/EP2016/060768
§ 371 (c)(1),
(2) Date: Nov. 13, 2017

(87) PCT Pub. No.: WO2016/184787
PCT Pub. Date: Nov. 24, 2016

(65) Prior Publication Data
US 2018/0144624 A1 May 24, 2018

(30) Foreign Application Priority Data
May 16, 2015 (DE) .......... 10 2015 006 298

(51) Int. Cl.
*G08G 1/042* (2006.01)
*B60L 11/18* (2006.01)
(Continued)

(52) U.S. Cl.
CPC .............. *G08G 1/042* (2013.01); *B60L 53/12* (2019.02); *B60L 53/30* (2019.02); *B60L 53/36* (2019.02);
(Continued)

(58) Field of Classification Search
CPC .......... G08G 1/042; H02J 50/90; H02J 50/40; H02J 50/60; B06L 11/182; B06L 11/1829;
(Continued)

(56) References Cited

U.S. PATENT DOCUMENTS 5,821,731 A * 10/1998 Kuki ...................... H02J 7/0045
320/108
6,351,098 B1 * 2/2002 Kaneko ................... H02J 7/025
320/108
(Continued)

FOREIGN PATENT DOCUMENTS

CN 103383801 A 11/2013
DE 102009033236 A1 1/2011
(Continued)

OTHER PUBLICATIONS

English translation of International Preliminary Report on Patentability, dated Nov. 30, 2017, of corresponding International Application No. PCT/EP2016/060768; 7 pgs.
(Continued)

*Primary Examiner* — Sisay Yacob
(74) *Attorney, Agent, or Firm* — Maier & Maier, PLLC

(57) ABSTRACT

A charging station for motor vehicles, including a primary coil for inductive transmission of energy to a battery of a motor vehicle and a metal detector. The metal detector is designed to detect a motor vehicle arranged above a charging station surface of the charging station. The charging station is provided with a transmitting device which is designed to transmit an occupancy signal if it is detected by the metal detector that a motor vehicle is arranged above the charging station surface.

6 Claims, 1 Drawing Sheet

(51) Int. Cl.
*G01B 7/00* (2006.01)
*H02J 50/40* (2016.01)
*H02J 50/60* (2016.01)
*H02J 50/90* (2016.01)
*B60L 53/12* (2019.01)
*B60L 53/30* (2019.01)
*B60L 53/38* (2019.01)
*B60L 53/36* (2019.01)
*B60L 53/60* (2019.01)

(52) U.S. Cl.
CPC .............. *B60L 53/38* (2019.02); *B60L 53/60* (2019.02); *G01B 7/003* (2013.01); *H02J 50/40* (2016.02); *H02J 50/60* (2016.02); *H02J 50/90* (2016.02); *Y02T 10/7005* (2013.01); *Y02T 10/7094* (2013.01); *Y02T 90/12* (2013.01); *Y02T 90/121* (2013.01); *Y02T 90/122* (2013.01); *Y02T 90/125* (2013.01); *Y02T 90/14* (2013.01)

(58) Field of Classification Search
CPC .............. B06L 11/1833; B06L 11/1838; B06L 2230/10; B01B 7/003
See application file for complete search history.

(56) References Cited

U.S. PATENT DOCUMENTS

| | | | | |
|---|---|---|---|---|
| 8,471,522 | B2* | 6/2013 | Virk | ........................ B66F 9/063 320/104 |
| 2002/0154032 | A1 | 10/2002 | Hilliard et al. | |
| 2002/0163444 | A1* | 11/2002 | Budnovitch | ............. B60Q 1/48 340/932.2 |
| 2011/0049978 | A1* | 3/2011 | Sasaki | ..................... H01F 38/14 307/9.1 |
| 2012/0043172 | A1* | 2/2012 | Ichikawa | ................ B60L 5/005 191/45 R |
| 2012/0181875 | A1* | 7/2012 | Wechlin | .................... B60L 3/00 307/104 |
| 2012/0282065 | A1* | 11/2012 | Virk | ........................ B66F 9/063 414/222.13 |
| 2012/0306262 | A1* | 12/2012 | Taguchi | .................... B60L 3/00 307/9.1 |
| 2014/0009112 | A1* | 1/2014 | Fontana | .............. B60L 11/1816 320/109 |
| 2014/0249742 | A1* | 9/2014 | Krivacic | ................. G06Q 10/02 701/400 |
| 2015/0109000 | A1 | 4/2015 | Sieber et al. | |
| 2015/0308905 | A1* | 10/2015 | Niizuma | ................ G08G 1/042 356/73.1 |
| 2015/0360577 | A1* | 12/2015 | Greenwood | ............ H02J 7/025 320/108 |

FOREIGN PATENT DOCUMENTS

| | | |
|---|---|---|
| DE | 102009033237 A1 | 1/2011 |
| DE | 202010011535 U1 | 11/2011 |
| DE | 102010042395 A1 | 4/2012 |
| DE | 102011118397 A1 | 5/2012 |
| DE | 102011015980 A1 | 10/2012 |
| EP | 0788212 A2 | 8/1997 |
| WO | 2010098412 A1 | 9/2010 |
| WO | 2011151696 A2 | 12/2011 |
| WO | 2014109110 A1 | 7/2014 |

OTHER PUBLICATIONS

German Examination Report dated Jan. 1, 2016 from corresponding of German Application No. 10 2015 006 298.0 (5 pages).
International Search Report dated Jul. 28, 2016 from corresponding of International Application No. PCT/EP2016/060768 with English version attached (15 pages).

\* cited by examiner

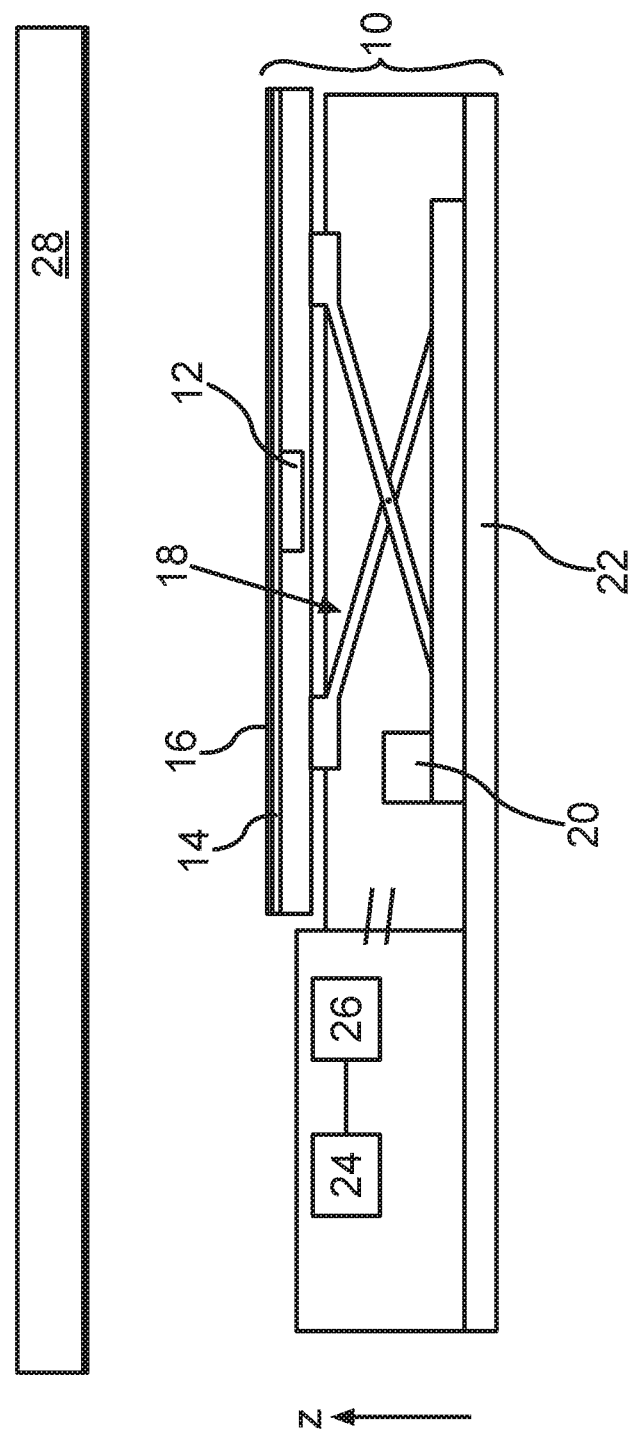

CHARGING STATION FOR MOTOR VEHICLES AND METHOD FOR OPERATING A CHARGING STATION

FIELD

The invention relates to a charging method for motor vehicles. In addition, the invention relates to a method to operate such a charging station.

BACKGROUND

DE 10 2011 015 980 describes a charging station for motor vehicles which is provided with a primary coil unit for inductive transmission of energy to a battery of a motor vehicle and with a metal detector. The metal detector in this case serves to detect metallic objects in a coupling region between the primary coil unit and a secondary coil unit of a motor vehicle. If metallic objects are detected by means of the metal detector, for example a warning can be triggered and the transmission of power, in particular of high-voltage current, to the primary coil element can be prevented.

DE 10 2009 033 236 A1 describes a device for inductive transmission of electric energy. The device comprises an apparatus for detecting an object within a space which comprises, at least during an energy transmission, a space located between a primary inductance of the device and a secondary inductance of the motor vehicle. By means of the device it is thus possible to detect foreign bodies in a field region of the primary inductance.

U.S. Pat. No. 5,821,731 A also describes a charging station for motor vehicles. The charging station includes a primary coil for inductively transmitting energy to a secondary coil of a motor vehicle in order to charge a battery of the motor vehicle in this manner. The charging station includes in addition at least one magnetic sensor by means of which the position of the secondary coil unit of a motor vehicle parked in the charging station can be detected.

SUMMARY

The objective of the present station is to provide a charging station for motor vehicles, as well as to provide a method for operating a charging station by means of which a charging state of the charging station can be determined and provided in a particularly simple manner.

This objective is achieved with a charging station for motor vehicles, as well as with a method for operating a charging station having the features of independent patent claims. Advantageous embodiments with expedient and non-trivial further development of the invention are specified in the dependent claims.

The charging station according to the invention comprises a primary coil for inductive transmission of energy to a battery of a motor vehicle and a metal detector. The charging station according to the invention is in this case characterized in that the metal detector is designed to detect a motor vehicle arranged above a charging surface of the charging station, wherein the charging station is equipped with a transmitting device which is designed to transmit an occupancy signal if it is detected by means of the metal detector that a motor vehicle is arranged above a charging station surface.

The charging station is in this case preferably integrated in such a parking space so that electric vehicles that are parked in this parking space can be charged. The metal detector is preferably designed as a coil, or it is provided with a transmitting coil and with a separate receiving coil. If the metal detector is designed as a coil, for example the impedance of the coil and/or the effective output of the coil can be measured in order to determine whether a motor vehicle is arranged just above or on the charging station surface. The motor vehicles usually have a plurality of metallic components, so that it can therefore be detected in a simple manner by means of the metal detector whether a motor vehicle is in fact parked on the charging station surface. The transmitting device can be additionally also designed to transmit a signal which indicates that the charging station is not currently occupied by a motor vehicle as long as no motor vehicle is detected by means of the metal detector above or on the charging station surface.

The metal detector is in particular designed to detect or recognize any motor vehicles which are arranged or parked above the charging station surface of the charging station. By means of the charging station according to the invention, it is also possible to inform other motor vehicles or their drivers that the relevant charging station is already occupied by a motor vehicle and thus it is not available for a charging operation.

In a preferred embodiment of the invention, it is provided that the metal detector is designed to detect a motor vehicle without a secondary coil. In other words, the metal detector is designed to detect and recognize any motor vehicles that are arranged on the charging station surface or above the charging station surface of the charging station. The metal detector is designed to detect any metallic objects of a motor vehicle as soon as a motor vehicle is arranged on the charging station surface or above the charging station surface. Since the charging station can be preferably integrated in a parking space, it is an advantage when the metal detector can detect also motor vehicles without secondary coils. This is because it is also possible that conventional vehicles, which is to say motor vehicles without an electric drive, are parked in the charging station. Even in such a case, the metal detector can still detect that the charging station is already occupied, so that the transmitting device can transmit said occupancy signal.

According to another advantageous embodiment of the invention it is provided that primary coil unit comprises a metal detector. The entire charging stations can thus be designed in a particularly compact manner because the detector is a part of the primary coil unit. It is preferred when the metal detector is in this case designed as a coil and configured for transmitting energy to a battery of a motor vehicle. In other words, the metal detector itself is thus designed as a primary coil, so that a voltage can be induced in a secondary voile of a vehicle to be charged by means of the primary coil. The metal detector is thus provided with double functionality, namely so that on the one hand, the metal detector serves to determine whether a motor vehicle is arranged on the charging station surface, and on the other hand, the metal detector is also additionally designed to induce a voltage in a secondary coil of a motor vehicle for charging the battery of the relevant motor vehicle. As a result, the charging station can be designed so as to contain generally fewer parts and so that it is particularly compact.

According to another advantageous embodiment of the invention it is provided that the charging station is equipped with a lifting mechanism, which is adapted to move the primary coil unit between a recessed storage position and a raised charging position. This is because with inductive charging, it is particularly important for the efficiency of the charging process that the distance between the primary coil unit and a secondary coil unit of a motor vehicle to be charged be particularly short. With the lifting mechanism, it is possible to bring the primary coil unit particularly close to a secondary coil unit of a motor vehicle to be charged, so that the charging process can be carried out particularly efficiently, which is to say at a high level of effectiveness.

According to the method in accordance with the invention for operating the charging station according to the invention, in a preferred embodiment for operating the charging station it is detected by means of a metal detector whether a motor vehicle is arranged above the charging station surface, so that an occupancy signal is transmitted by means of a transmission device if it is detected by means of a metal detector that a motor vehicle is arranged above the charging station surface. Advantageous embodiments of the charging station should be in this case regarded as advantageous embodiment of the method of the invention, wherein the charging station is in particular provided with a means for carrying out the steps of the method.

According to a preferred embodiment of the invention it is provided that it is ascertained by means of a method detector in predetermined intervals whether a motor vehicle is currently arranged on the charging station surface as long as the primary coil is not operated for charging a battery. In other words, the metal detector is operated in such way so that it can be determined by means of the metal detector whether a motor vehicle is located above the charging station surface, or on the charging station surface.

The metal detector can be actuated for example in cyclic intervals of a few seconds, or even in intervals of a few minutes in order to determine whether a motor vehicle is arranged above or on the charging station surface. This makes it possible to determine in a reliable manner whether the charging station is currently free or occupied.

Finally, according to a further embodiment of the invention, it is provided that if the metal detector is designed as a coil for transmission of energy to a battery of a motor vehicle, the metal detector is used to ascertain whether a motor vehicle that is arranged above the charging station is charged with an output that is smaller than the charging output for transmitting energy to a battery of a motor vehicle. This makes it possible to ensure that no damage will be caused to vehicles which are provided only with an internal combustion engine and which do not have a battery to be charged by means of induction, in particular to the metallic parts of such motor vehicles.

Other advantages, features and details of the invention will become apparent from the following description of the preferred embodiments and from the drawing. The features and combinations of the features mentioned above in the descriptions, as well as the features and combinations of the features mentioned and/or shown only in the figures can be used not only in the respective indicated combinations, but also in other combinations or individually, without deviating from the scope of the invention.

BRIEF DESCRIPTION

Embodiments of the invention will be explained next in more detail with reference to FIG. 1, in which is schematically illustrated a charging station for inductive charging of a battery of a motor vehicle, wherein the underbody of a motor vehicle is indicated above the charging station.

DETAILED DESCRIPTION

FIG. 1 shows a schematic lateral view of a charging station for motor vehicles, indicated generally by the numeral 10. The charging station 10 comprises a primary coil unit 12 for inductive transmission of energy to a battery of a motor vehicle, and a metal detector 14, which is arranged below a charging station surface 16 of a charging station 10.

In addition, the charging station 10 is also provided with a lifting mechanism 18, which is designed to move between a recessed storage position and a raised charging position. In other words, the lifting mechanism 18 can move the primary coil unit 12 together with the metal detector 16 in the direction upwards in the charging station, as indicated by the arrow z, as well as in the downward direction. In order to drive or adjust the lifting mechanism 18, the charging station 10 comprises also a drive unit 20, which can be for example an electric motor. As can be seen in the FIGURE, the lifting mechanism 18 is in the present case designed in the form of a scissor lift table, while other embodiments of the lifting mechanism 18 are also possible. Furthermore, the charging station 10 is also provided with an aluminum bottom plate 22, which shields the charging station in the downward direction. This has in particular the advantage that when the primary coil unit 12 is operated to charge a battery of a motor vehicle, a magnetic field is created, which is shielded in the downward direction by means of the aluminum bottom plate 22.

The charging station 10 comprises in addition also a transmitting device 24, which is designed to transmit an occupancy signal if it is detected by means of the metal detector 14 that a motor vehicle is arranged on the charging station surface 16. Moreover, the charging station 10 is also provided with a control unit 26 which is designed to control signals as a function of signals received by the metal detector 14. In other words, the control device 26 thus forms a link between the metal detector 14 and the transmitting device 24.

FIG. 1 further shows a motor vehicle underbody of a motor vehicle, not indicated in the FIGURE, wherein the motor vehicle underbody 28 is arranged above the charging station surface 16. In other words, the motor vehicle is therefore parked so that the motor vehicle underbody 28 is arranged in the vertical direction z at a slight distance from the charging station surface 16. The metal detector 16 is in this case designed to detect any vehicles—as long as they have metallic components. In other words, the metal detector 16 is also designed to detect and recognize vehicles without a secondary coil. The charging station 10 is preferably included or integrated in a parking space, not further indicated. Motor vehicles that are driven purely by means of an internal combustion engine, as well electric motor vehicles can thus be parked in the parking space and therefore above the charging station 10.

It is ascertained in predetermined intervals by means of the metal 16 whether a motor vehicle is arranged on the charging station surface 16, preferably at least as long the primary coil unit 12 is not operated for charging a battery of a motor vehicle. For this purpose, the control device 26 cyclically controls the metal detector 14 in such a way that it is checked by means of the metal detector 14 whether a motor vehicle is currently arranged or is not arranged above the charging station surface 16. As soon as it is determined with the metal detector 16 that a motor vehicle is arranged on or above the charging station surface 16, the control device 26 controls the transmitting device in such a way that an occupancy signal is transmitted or emitted by the transmitting device 24.

This occupancy signal can be received by other motor vehicles, so that it is then clear, in particular to respective drivers of the motor vehicles, that the charging station 10 is currently occupied. The occupancy signal can be in this case transmitted wirelessly, for example via radio frequencies, over a WLAN network, or the like. The motor vehicles in the vicinity can therefore easily detect whether the charging station 10 is currently occupied, or whether it is currently not occupied. This is information that is important in particular for electric vehicles or for hybrid vehicles, since the driver of such motor vehicles can thus determine in a simple manner whether or not to approach the charging station 10 for charging his motor vehicle.

The primary coil unit 12 can also include the metal detector 14, wherein the metal detector 14 is formed in this case as a coil for transmission of energy to a battery of a motor vehicle. In other words, it can be also provided that the metal detector 14 is designed as a primary coil, by means of which a voltage can be induced in a respective secondary coil of a motor vehicle for charging the relevant battery of the motor vehicle.

The metal detector 14 therefore has in this case a double functionality. On the one hand, it can be detected by means of the metal detector 14 whether the charging station per se is in fact occupied, wherein it is ascertained by means of the metal detector 14 whether a motor vehicle is currently arranged above the charging station 10. In addition, the metal detector 14 can be used to induce a voltage in a secondary coil of a motor vehicle to be charged. With the integration of the functions, a particularly compact primary coil unit 12 can be provided with the metal detector 14 when the metal detector 14 is provided with said double functionality.

In the case when the metal detector 14 is designed as a coil for transmission of energy to a battery of a motor vehicle, an output that is smaller than the charging output for transmitting energy to a battery of a motor vehicle is supplied to the metal detector in order to determine whether a motor vehicle is arranged on or above the charging station surface 15. In particular when the motor vehicle arranged above the charging station 10 is a motor vehicle without a secondary coil, this can therefore prevent damage that could be caused to the metal components of the motor vehicle.

Motor vehicles located in the vicinity of the charging station 10 can be thus also informed in a simple and reliable manner by means of the described charging station 10 and by the means of the described method for operating the charging station 10 that the charging station 10 is currently occupied, and in particular independently of whether the charging station 10 is currently occupied by an electric vehicle, by a hybrid vehicle, or by a motor vehicle that is operated exclusively by means of an internal combustion engine.

The invention claimed is:

1. A charging station for motor vehicles comprising:
   a primary coil for inductive transmission of energy to a battery of a motor vehicle and a metal detector, wherein the metal detector detects a motor vehicle arranged above a charging station surface of the charging station; and
   the charging station is provided with a transmitting device, which transmits an occupancy signal if it is detected by the metal detector that a motor vehicle is arranged above the charging station surface, wherein the occupancy signal is transmitted to at least one other motor vehicle indicating that the charging station is occupied; and
   an aluminum bottom plate shielding the charging station from the inductive transmission of energy in a downward direction,
   wherein the primary coil includes the metal detector such that the metal detector is formed for both detecting the motor vehicle on the surface of the charging station and for inducing a voltage in a secondary coil of the motor vehicle.

2. The charging station according to claim 1, wherein the metal detector detects a motor vehicle without a secondary coil.

3. The charging station according to claim 1, wherein the charging station is provided with a lifting mechanism, which is designed to move the primary coil between a recessed storage position and an extended charging position.

4. A method for operating a charging station, comprising:
   detecting by a metal detector whether a motor vehicle is arranged above a charging station surface wherein an occupancy signal is transmitted by a transmitting device of the charging station if it is detected by the metal detector that a motor vehicle is arranged above the charging station surface,
   wherein a primary coil which charges the motor vehicle includes the metal detector such that the metal detector is formed for both detecting the motor vehicle on the surface of the charging station and for inducing a voltage in a secondary coil of the motor vehicle, and the charging station is shielded in a downward direction, by an aluminum bottom plate, from a magnetic field created by the primary coil and the metal detector.

5. The method according to claim 4, further comprising ascertaining by the metal detector in predetermined intervals whether a motor vehicle is arranged on the charging station surface as long as a primary coil is not operated to charge a battery of a motor vehicle.

6. The method according to claim 5, wherein if the metal detector is designed as a coil and for transmitting energy to a battery of a motor vehicle, the metal detector, which is arranged to check whether a motor vehicle is arranged above the charging station surface, is provided with an output which is smaller than a charging output for transmitting energy to a battery of a motor vehicle.

* * * * *